United States Patent [19]

Spinelli et al.

[11] Patent Number: 4,669,857
[45] Date of Patent: Jun. 2, 1987

[54] DOUBLE DUAL RATE PRECESSION SCAN SYSTEM

[75] Inventors: Richard A. Spinelli, Rochester; Daniel W. Costanza; William L. Statt, both of Webster; Edwin F. Glab, Fairport, all of N.Y.

[73] Assignee: Xerox Corporation, Stamford, Conn.

[21] Appl. No.: 748,072

[22] Filed: Jun. 24, 1985

[51] Int. Cl.$^4$ ............................................. G03G 15/28
[52] U.S. Cl. ........................................... 355/8; 355/55
[58] Field of Search ..................... 355/3 R, 8, 11, 55

[56] References Cited

U.S. PATENT DOCUMENTS

| | | | |
|---|---|---|---|
| 3,542,467 | 11/1970 | Ferguson et al. | 355/8 |
| 3,614,222 | 10/1971 | Post et al. | 355/8 |
| 4,265,990 | 5/1981 | Stolka et al. | 430/59 |
| 4,336,995 | 6/1982 | Durbin et al. | 355/8 |
| 4,351,605 | 9/1982 | Carpenter et al. | 355/8 |
| 4,362,382 | 12/1982 | Simpson | 355/66 |
| 4,397,264 | 8/1983 | Hatch | 118/656 |
| 4,484,810 | 11/1984 | Spinelli | 355/8 |

OTHER PUBLICATIONS

U.S. Ser. No. 642,272, Stoffel et al. filed 08/1984.

Primary Examiner—Fred L. Braun

[57] ABSTRACT

An electrophotographic printing system incorporates two sets of moving optical components, one on each side of a projection lens. A document on a platen is scanned by a first set of moving mirrors with the scanned image projected by a lens towards a photoreceptor. A second set of moving mirrors precesses the image onto the photoreceptor. In one embodiment, a drive system commonly drives both the object side and the image side mirrors to provide the required document scan and precess motions. In a second embodiment, the image side system is driven as a function of the photoreceptor (process) speed.

9 Claims, 13 Drawing Figures

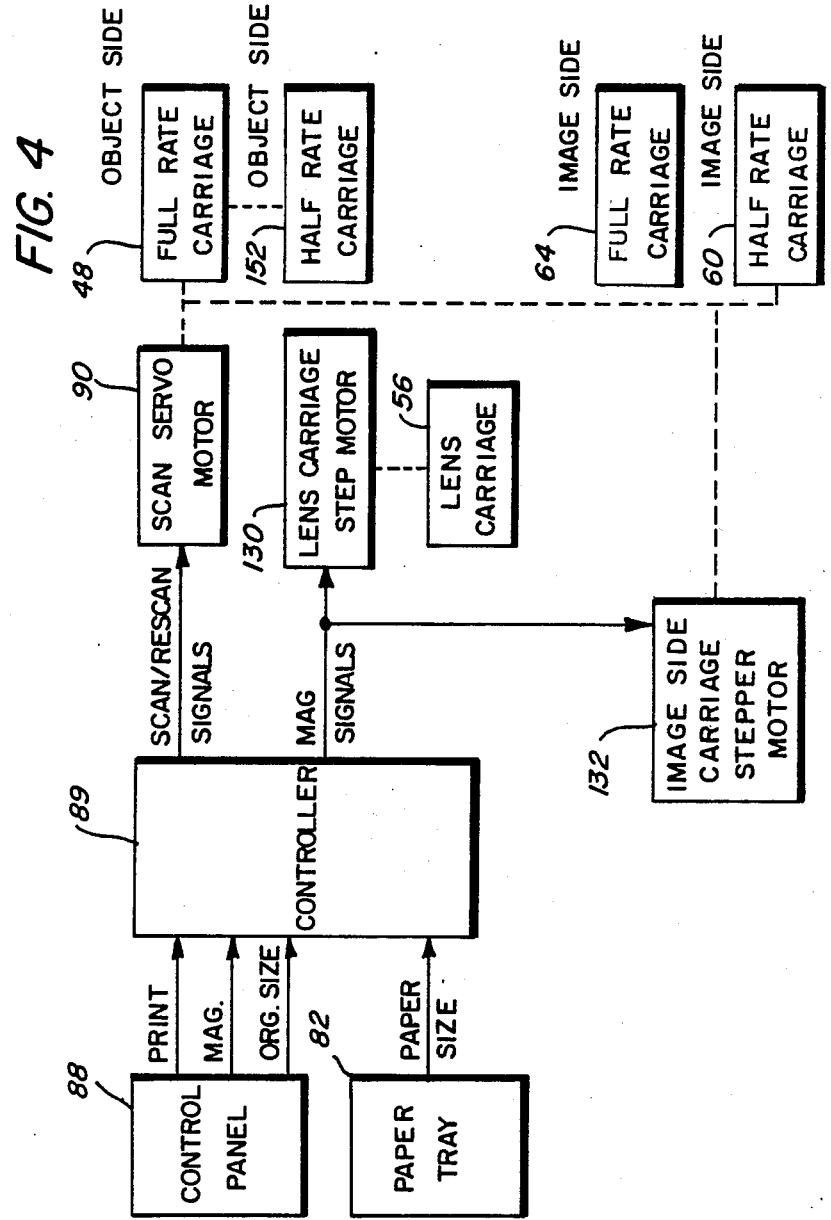

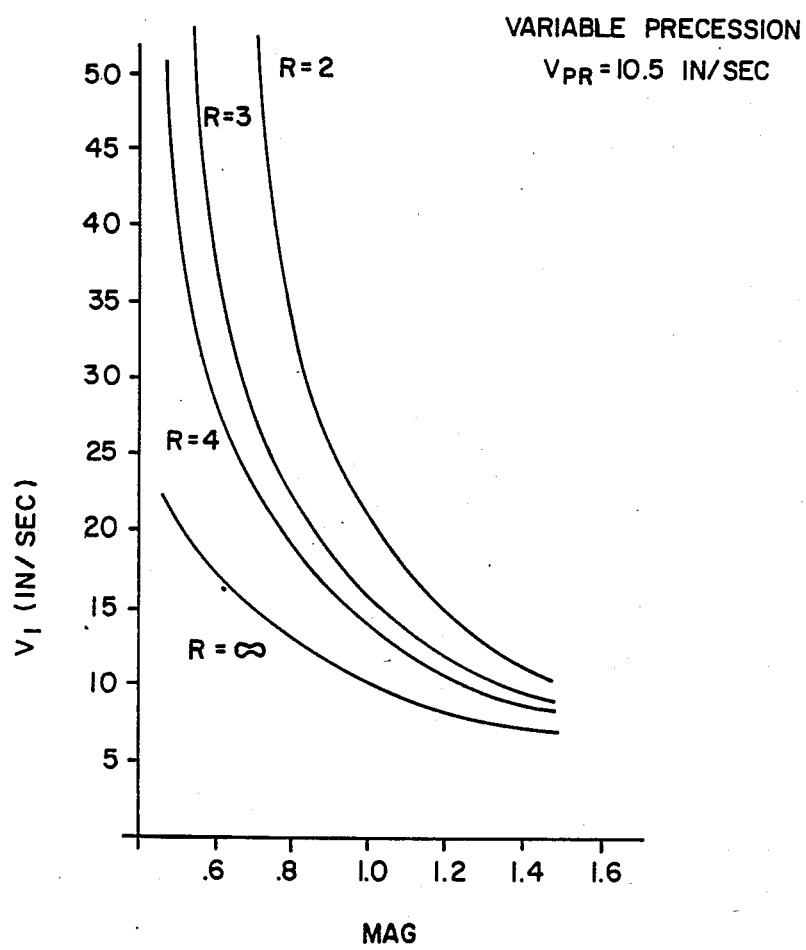

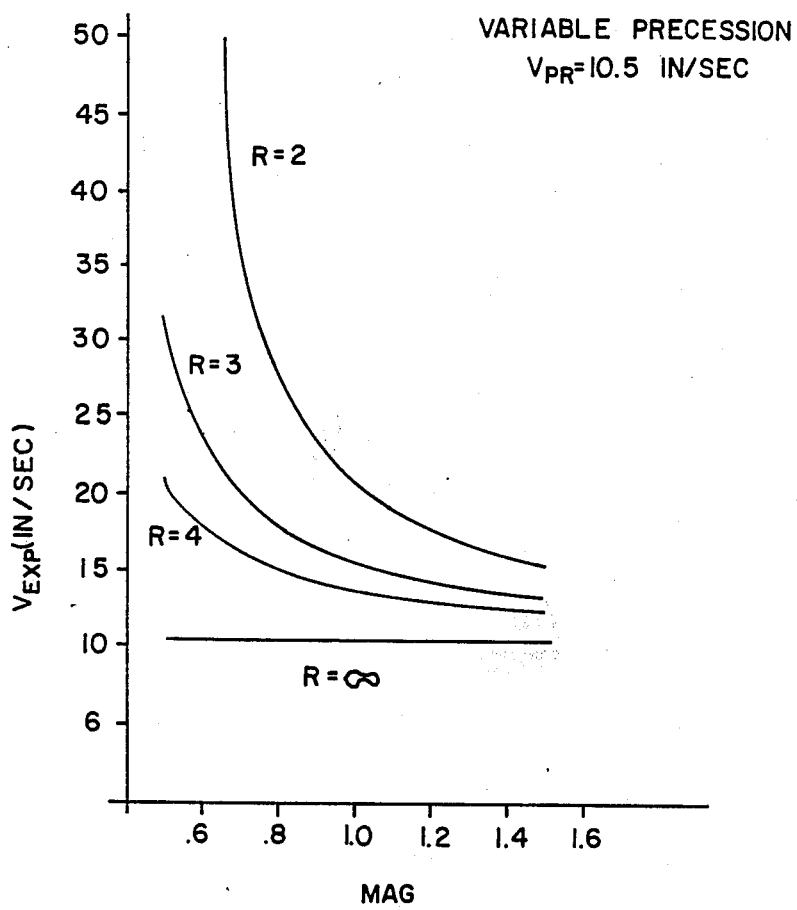

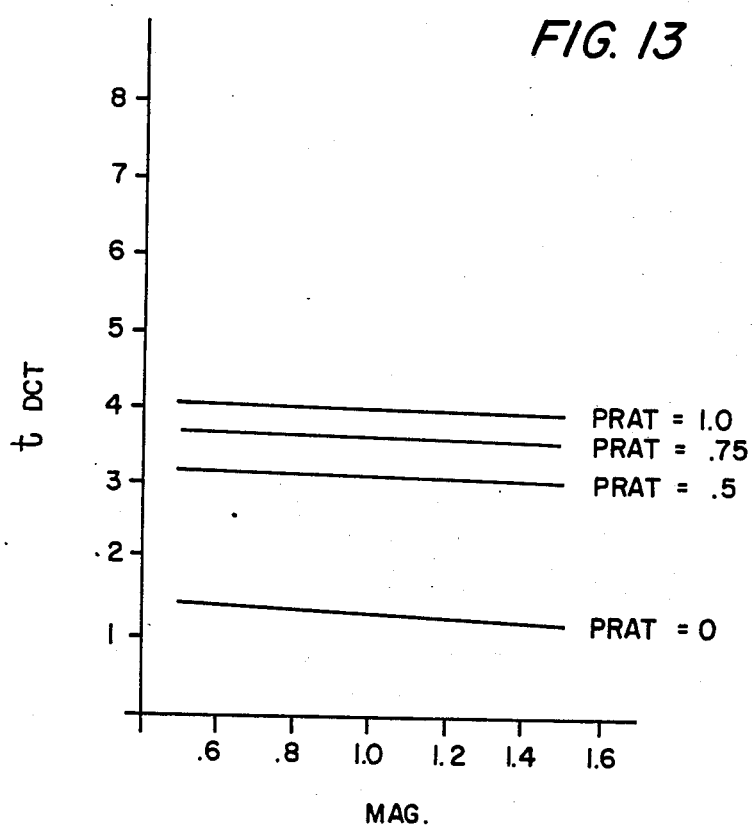

DOUBLE DUAL RATE PRECESSION SCAN SYSTEM

BACKGROUND AND PRIOR ART

This invention relates generally to an electrophotographic printing system and, more particularly, to a folded optical system which scans a document and projects the scanned image in a precession mode onto a moving flat photoreceptor.

Precession scan systems which expose images on a flat photoreceptor in a direction opposite the photoreceptor movement are known in the art. The advantages of such systems are also well known. U.S. Pat. No. 4,336,995 discloses the velocity relationships which must be present between the document scanning optical components and the photoreceptor. U.S. Pat. No. 4,351,605 discloses a precession system operating under the dual conditions of document scan or continuous velocity transport. U.S. Pat. No. 4,362,382 discloses a specific scan system utilizing a moving corner mirror assembly between the lens and the photoreceptor to accomplish the image precession. U.S. Pat. No. 4,484,810 discloses a hybrid precession scanning system where the platen, scan elements and lens are all moved in specific relationships with each other and with the photoreceptor.

In U.S. patent application No. 642,272, filed on Aug. 20, 1984, now U.S. Pat. No. 4,585,331, and assigned to the same assignee as the present invention, there is disclosed a precession scanning system in which the mirror clusters comprising the scan elements are each driven by an independently controlled linear drive motor.

The advantages of utilizing a precession system are well understood. In any scanning system, the scan components (lamp, mirrors) must be returned to the start-of-scan position after each scan operation. This return time reduces throughput and leaves an inter-document gap which ordinarily must be discharged in some way. By forming a complete document image at the photoreceptor, at greater than process velocity, a time interval (precess interval) is established during which the system scan elements can be returned to the start-of-scan position before the next image from on the photoreceptor advances to the next start-of-scan position. Thus, throughput could be increased or, alternatively, the process speed can be set at a lower speed for equivalent copy rate. Scan return velocities for a given copy rate can also be minimized.

The prior art precession scan systems have heretofore been limited in the output precessing speeds to about 75 cpm. According to one aspect of the present invention, there is provided a precession scanning system capable of process speeds up to 110 cpm. There is also provided an improved drive system for the scan components capable of changing precession scan speeds and precession ratio in accordance with different document sizes and magnification ratios. More particularly, the invention is directed to a precession scanning system for an electrophotographing printing machine comprising:

an object side scanning system adapted to incrementally scan/illuminate a document lying on a platen surface at a scan speed $V_1$;

a lens positioned along the optical path, said object side scanning system reflecting said incrementally scanned images into said lens;

an image side scanning system adapted to reflect the projected incremental document images onto the surface of a photoreceptor in a direction opposite the direction of the moving photoreceptor along a precession distance and at a precession scan speed $V_3$; and means for driving said object and image side scanning system in a scan and rescan direction at speeds relative to each other and to the photoreceptor speed so as to enable the image to be precessed onto the photoreceptor.

FIG. 4 is a control logic block diagram for controlling the scan operations of the variable precession system.

FIG. 6 is a plot of scan speed through a magnification range for the variable precession system.

FIG. 7 is a plot of exposure velocity through magnification range for the variable precession system.

FIG. 13 is a plot of values of document change time through a magnification range at different precession ratios.

Figure 1:
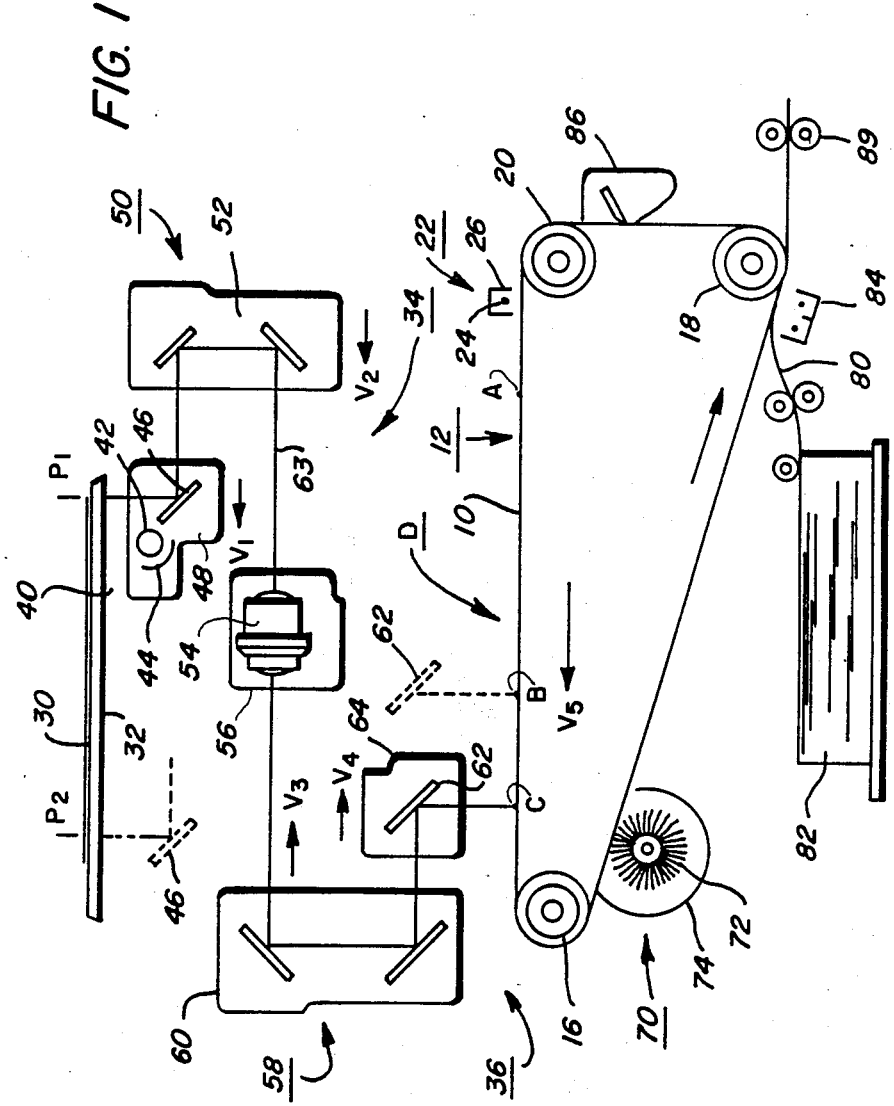
FIG. 1 is a side view of an electrophotographic copying machine which illustrates the double dual rate precession scanning system of the present invention.

For a general understanding of the features of the present invention, reference is made to the drawings. In the drawings, like reference numerals have been used throughout to designate identical elements. FIG. 1 schematically depicts the various components of an illustrative electrophotographic printing machine incorporating the optical precession scanning system of the present invention therein. It will become apparent from the following discussion that this optical system is equally well suited for use in a wide variety of electrophotographic printing machines and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

Turning now to FIG. 1, the electrophotographic printing machine uses a photoreceptor belt 10 having a photoconductive surface 12 formed on a conductive substrate. Preferably, belt 10 has characteristics disclosed in U.S. Pat. No. 4,265,990 whose contents are hereby incorporated by reference. Belt 10 moves in the indicated direction, advancing sequentially through the various xerographic process stations. The belt is entrained about drive roller 16 and tension rollers 18, 20. Roller 16 is driven by motor means described in detail below.

With continued reference to FIG. 1, a portion of belt 10 passes through a charging station where a corona generating device, indicated generally by the reference numeral 22, charges photoconductive surface 12 to a relatively high, substantially uniform, negative potential. Device 22 comprises a charging electrode 24 and a conductive shield 26.

As belt 10 continues to advance, the charged portion of surface 12 moves into exposure station D. An original document 30 is positioned, either manually, or by a document feeder mechanism (not shown) on the surface of a transparent platen 32. The document is scanned and reproduced at the photoreceptor by a double dual rate scanning system comprising an object side scan system 34 and an image side scan system 36. The optical components included in scan system 34 are illumination scan assembly 40, comprising illumination lamp 42, lamp reflector 44 and full rate scan mirror 46, all three mounted on full rate scan carriage 48. Carriage 48 is moved at a first scanning speed $V_1$ in a plane parallel to that of platen 32 and from right to left. Lamp 42 illuminates incremental line portions of document 30 during the scan cycle. The reflected image is reflected by scan mirror 46 to half rate roof mirror assembly 50 mounted on half rate carriage 52. Carriage 52 is driven at $\frac{1}{2}$ rate of carriage 48 or at a speed $V_{\frac{1}{2}}$. Assembly 50 and carriage 52 complete the optical components included in the object side scan system 34.

Figure 3:
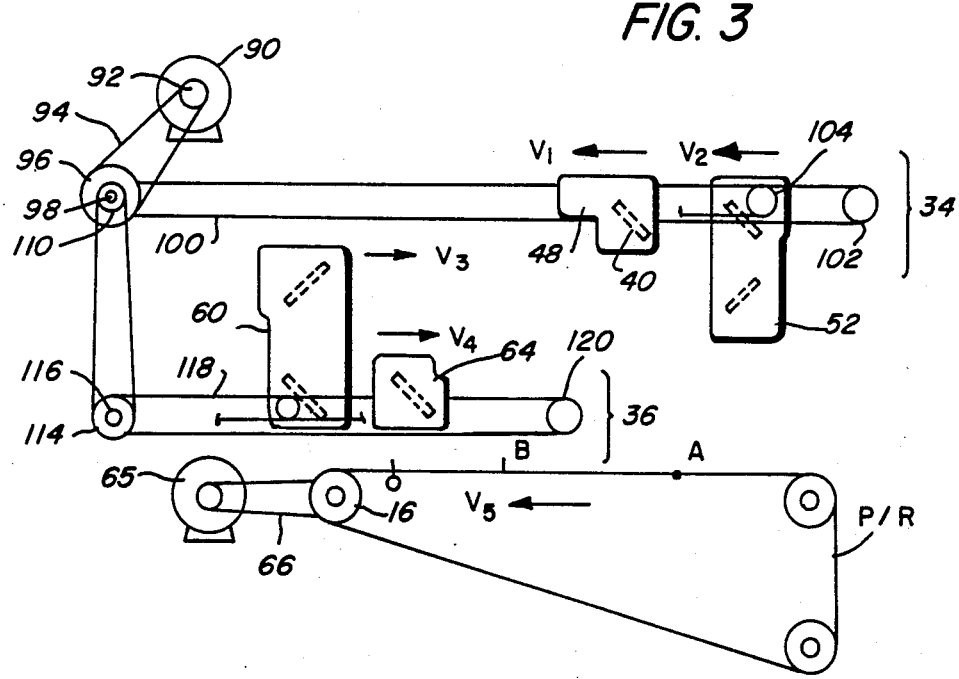
FIG. 3 is a simplified side view of the mechanical drive arrangement of FIG. 2.

The document line image is projected by lens 54, mounted on lens carriage 56 onto a second, full rate roof mirror assembly 58 mounted on half rate carriage 60. The image is reflected from assembly 58 to belt mirror 62, mounted on carriage 64 driven during scan at a speed $V_3$. Carriage 60 is driven at a speed $V_3-V_4/2$. Mirror 62 is thus moving in a direction opposite the movement of belt 10 and during scan precesses the document image along the belt surface. Belt 10 is moved at a fifth rate $V_5$ corresponding to the system process speed (up to 75 cpm for the variable speed configuration). Belt 10 is driven by main drive motor 65 via pulley 66 (FIG. 3).

In operation, lens 54 is moved to the appropriate magnification position with the mirror components at the selected start-of-scan positions. A portion AC of belt 10, representing a distance equal to document length $P_1-P_2$ (not shown to scale in the figure) will be exposed during the scan cycle with point C defining the image point of document point $P_1$. Scan carriage 48 moves from right to left at a scan velocity $V_1$. Roof assembly 50 moves at a second velocity $V_2$, which, is equal to $V_{\frac{1}{2}}$, to maintain a constant object-to-lens distance. A reflected image of the document, represented by a principal ray 63, is imaged through lens 54 and folded by corner mirror assembly 58 moving from left to right at velocity $V_3$. The image is then reflected onto belt 10 by mirror 62, moving at $V_4$ (2 $V_3$) so that the image is precessed during scan a distance equal to BC. Point A reaches point B at the end-of-scan position. Thus, incremental portions of the document are illuminated and incremental images are reflected along the optical path and projected by lens 54 as a flowing image onto belt 10 forming a latent image of the document on the belt.

Continuing with the description of the xerographic stations, a magnetic brush development system, indicated generally by the reference numeral 70 advances an insulating development material into contact with the electrostatic latent image. Preferably, magnetic brush development system 70 includes a developer roller 72 within a housing 74. Roller 72 transports a brush of developer material comprising magnetic carrier granules and toner particles into contact with belt 10. Roller 72 is positioned so that the brush of developer material deforms belt 10 in an arc with the belt conforming, at least partially, to the configuration of the developer roller. The thickness of the layer of developer material adhering to developer roller 72 is adjustable. The electrostatic latent image attracts the toner particles from the carrier granules forming a toner powder image on photoconductive surface 12. The detailed structure of the magnetic brush development system is more fully disclosed in U.S. Pat. No. 4,397,264, whose contents are hereby incorporated by reference.

Continuing with the system description, an output copy sheet 80 taken from a supply tray 82, is moved into contact with the toner powder image at a transfer station which includes a corona generating device 84 which sprays ions onto the backside of sheet 80, thereby attracting the toner powder image from surface 12 to sheet 80. After transfer, the sheet advances to fusing roller assembly 89, which affixes the transferred powder image. After fusing, sheet 80 advances to an output tray (not shown) for subsequent removal by the operator.

After the sheet of support material is separated from belt 10, the residual toner particles and the toner particles of developed test patch areas are removed at cleaning station 86.

Subsequent to cleaning, a discharge lamp, not shown, floods surface 12 with light to dissipate any residual charge remaining thereon prior to the charging thereof for the next imaging cycle.

It is believed that the foregoing description is sufficient for purposes of the present application to illustrate the general operation of an electrophotographic printing machine incorporating the main feature of the present invention therein.

The electrophotographic printing machine shown generally in FIG. 1 can be operated as either a medium process speed system (up to 75 cpm) or at a high process speed system (75-110 cpm). The medium speed system, for ease of description, has been designated as a variable precession system. Its main characteristic is that the scanning components of the object and image side scan system 34, 36 are driven by a common drive means and hence a precession ratio $P_{RAT}$ which is defined as $P_{RAT}$ $V_4/V_5$ and which varies directly with magnification. The higher speed system has been designated as a constant precession system. For this system, the object and image side scan systems are decoupled with the image side system driven at a constant speed derived as a function of the photoreceptor speed. A description of the variable precession drive system at 1X and at magnification is provided below, followed by a description of the constant precession drive system at 1X and magnification.

Figure 2:
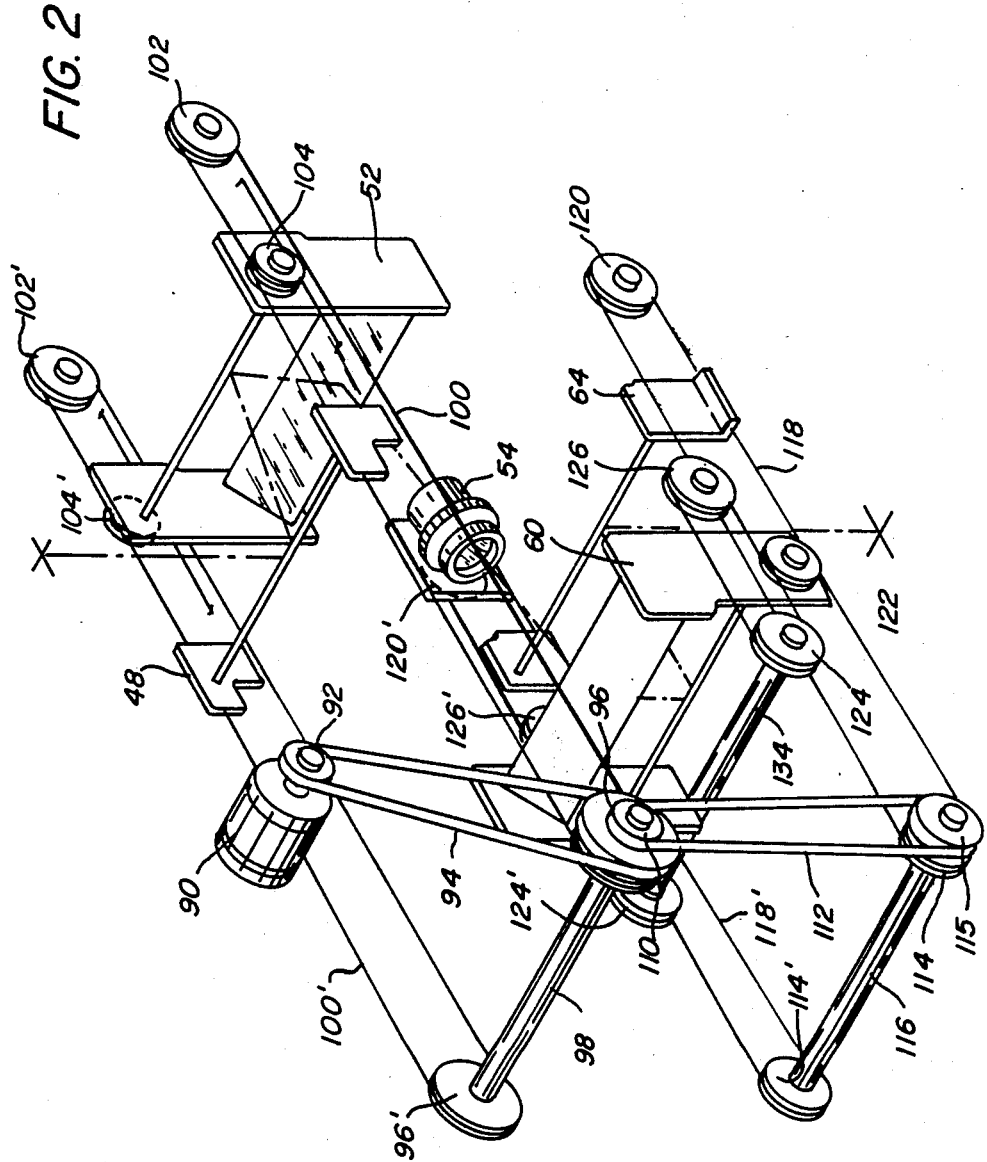
FIG. 2 is a top perspective view of the mechanical drive arrangement for moving the document scan and precession scan components in a first, variable precession configuration.

Referring now to FIGS. 2 and 3 there is shown a top perspective view of the drive system for object and image side scan systems 34, 36. It is assumed that an $8\frac{1}{2} \times 11$ document is to be copied at 1:1 magnification ratio in a variable precession mode.

FIG. 4 illustrates the circuit and logic elements which generate signals to the various scan components based on operator selections at the machine control panel 88 or paper tray 82. The inputs are processed by controller 89 and signals sent to the appropriate components.

Selection of a print operation at the machine control panel 88 generates an electrical signal which is sent to a scan servo drive motor 90 via controller 89. Motor shaft 92 drives timing belt 94 which is entrained about capstan pulley 96 attached to drive shaft 98. A second capstan pulley 96' is connected to the other end of shaft 98. Cables 100, 100' are entrained about idler pulleys 102, 102' and half rate pulleys 104, 104' with both ends connected to ground. As shaft 98 rotates in the indicated direction, carriage 48, upon which is mounted the scan illumination assembly 40 is moved in a parallel path beneath the platen at a scanning speed $V_1$. The speed of carriage is divided in half by the pulley 104 so that half rate carriage 52, upon which is mounted corner mirror assembly 50, is moving at a speed of $V_{\frac{1}{2}}$. Thus, the scan movements of the optical components comprising the object scan side system 34 are seen to derive directly from the input shaft 98.

The drive for the image scan system 36 is derived from the rotation of drive shaft 98 via a pulley 110, mounted on the output end of shaft 98. Belt 112 is entrained about pulley 110 and about pulley 115 mounted on the end of image side scan drive shaft 116. Cables 118, 118' are entrained about full rate capstan pulleys 114, 114', idler pulleys 120, 120', half rate pulleys 122, 122', and magnification change pulleys 124, 124', 126, 126' in a closed loop drive system. The drive movement of shaft 98 is translated into a new set of scan speed relationships determined by the pulley diameter ratio of pulleys 96 and 115. During scan, as shaft 98 rotates in the indicated direction, carriage 64, upon which is mounted precession mirror 62, is moved at a speed of $V_4$ ($2V_3$) while roof mirror carriage 60, upon which is mounted corner mirror assembly 58, is moved at speed $V_3$.

OPERATION IN 1X MODE

In operation, the start-of-scan operation is initiated with the object and image scan systems in the solid line positions shown in FIGS. 2, 3. A portion AC of belt 60 equal to document length $P_1$, $P_2$ will be exposed during the scan cycle with point C defining the image point of object point $P_1$. Scan servo motor 90 is driven at a rate previously determined relative to the process speed for the particular system and for a time duration dependent upon the length of the document being copied. The precess condition requires that $V_1 > V_5$. Full rate scan carriage 48 is driven at a scan rate $V_1$ which is called the exposure speed and is defined by the expressions $$V_1 = 1 + (V_4/V_5)V_5V_5 + V_4 \qquad (1)$$

Half rate carriage 52 moves in the scan direction at a rate $V_{\frac{1}{2}}$.

Image side full rate scan carriage 64 is moved from left to right at a third rate $V_4$ which is defined by the expression $V_4 = V_{1/R}$. Half rate scan carriage 60 is moved in the indicated direction at a rate $V_{4/2}$. As the scan progresses, the document image is reflected onto the surface 12 of photoreceptor 10 in a precess direction opposite the movement of the belt 10 and along a precession distance equal to BC. During scan the belt moves so that point A reaches point B at the end-of-scan position. This distance AB is defined by the expression $$AB = (P_1P_2/V_1)V_5 \qquad (2)$$

When the scan components reach the end of scan position (mirrors 46, 62 in dotted line position) scan motor 90 reverses directional rotation and the components are returned to the start-of-scan positions.

MAGNIFICATION

Referring again to FIGS. 2, 3 and 4, a change in magnification from 1X at the control panel 82 generates a signal to controller 89 which in turn, generates the signals which drive lens carriage step under 130, and hence lens carriage 56, along the optical path and to make adjustments for the change in total conjugate length.

Servo motor 90 will be driven at a faster rate of speed (for reduction) or a slower rate of speed (for enlargement) relative to 1X scanning speed. Lens carriage stepper motor 130 (FIG. 4) will be driven to move lens carriage 56 along the optical path to a new position consistent with the required magnification. Movement of the lens to a new position changes the total conjugate (TC) (distance between the platen and photoreceptor) in accordance with the expression.

$$TC = F(M+1) + F(1+1/M)$$

where F is the focal length of the lens and M is the magnification. Compensation for this change is provided by moving the start-of-scan position of image side half rate image carriage 60 via signals to dc stepper motor 132. Motor 132 drives magnification drive shaft 134 in the appropriate direction. The motion of shaft 134 is transferred, via pulleys 124, 124' and cables 118, 118' to half rate carriage 60 moving the carriage to the new position required to maintain a constant overall conjugate. Once these lens and carriage positions are effected, scan operation proceeds as in 1X operation. The change in scanning rate is paralleled by a change in photoreceptor distance AC which is defined by the expression $$AC = MP_1P_2 \qquad (3)$$

Figure 5:
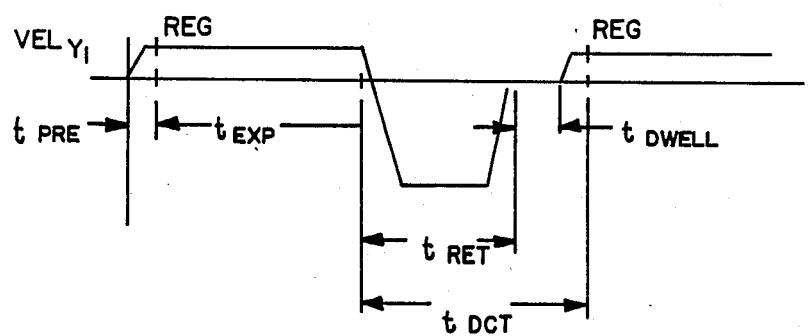
FIG. 5 is a typical velocity profile over a scan cycle.

FIG. 5 illustrates a typical velocity profile over a scan cycle. Exposure time, represented by $t_{EXP}$ is obtained by the expression $$t_{EXP} = \frac{P_1P_2}{\frac{M}{V_1}} \qquad (4)$$

Document change time, $t_{DCT}$, is given by the expression $$t_{DCT} = t_{cycle} - \frac{P_1P_2 M}{1 + P_{RAT} V_5} \qquad (5)$$

where $P_{RAT} = 1/(MR-1)$

Scan optics return time $t_{RET}$ is given by $$t_{RET} = t_{DCT} - t_{dwell} - t_{pre} \qquad (6)$$

Figure 8:
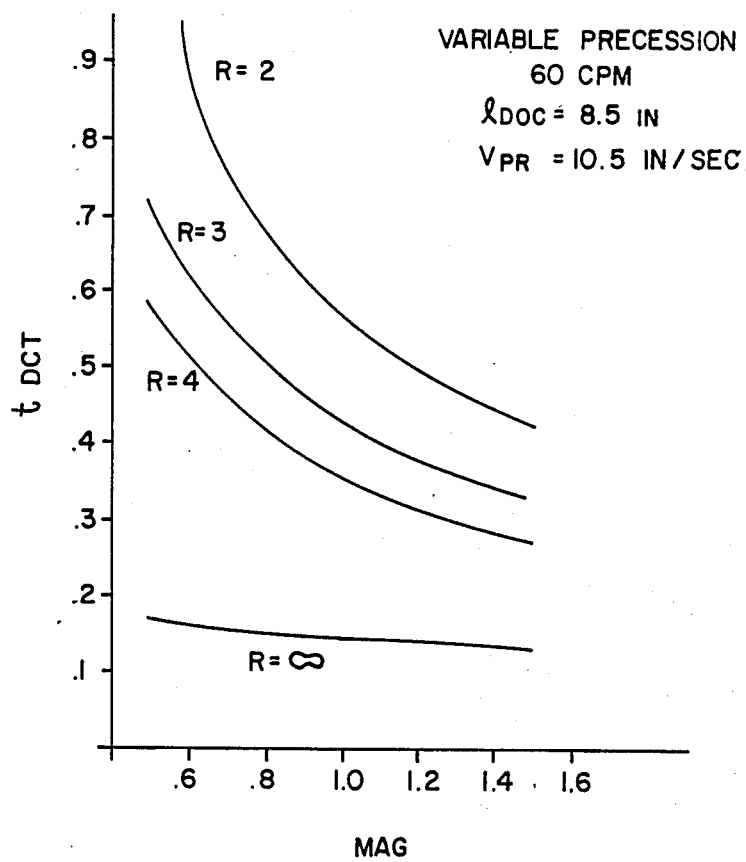
FIG. 8 is a plot of values document change time through a magnification range for the variable precession system.

FIGS. 6 through 8 represent plots of magnification vs $V_1$ (FIG. 6), $V_{EXP}$ (FIG. 7) and $t_{DCT}$ (FIG. 8) for various values of R and at $V_5=10.5$ in/sec (26.67 cm/sec) at a rate of 60 cpm for a letter size document ($8\frac{1}{2} \times 11$ inches or $21.67 \times 27.9$ cm).

An example of a typical set of parameters associated with 60 cpm variable precession scan system, at 1X magnification, are as follows:

| | |
|---|---|
| scan speed $V_1$ = | 17.5 in/sec (44.45 cm/sec) |
| photoreceptor speed $V_5$ = | 10.5 in/sec (26.67 cm/sec) |
| precess scan speed $V_4$ = | 7.0 in/sec (17.78 cm/sec) |
| precession distance BC = | 7.0 in/sec (17.78 cm/sec) |
| prescan acceleration | 2.0 g's |
| return time = | .375 sec |
| document change time = | .514 sec |
| precession ratio ($P_{RAT}$) = | .6667 |
| exposure time = | .486 sec |
| R = | 3.0 |

The defining characteristics of variable precession operation can be summarized as follows:

1. The image side scan system 36 is directly coupled to object side scan system. A change in the scan speeds on the object side is reflected in changes in the image side.

2. As a corollary of 1, the precession ratio is a function of magnification $$(P_{RAT}=1/(MR-1)).$$

3. The scan velocities are dependent on original document size and output sheet size.

CONSTANT PRECESSION

The variable precession system described above becomes constrained as process speeds exceed 75 cpm. For example, if the system shown in FIGS. 2, 3 were to be used in a copying machine having an 80-90 cpm rate, a maximum scan velocity $V_1$ of 80 in/sec (203.2 cm/sec) would have to be achieved. This would require prescan accelerations of up to 4 g's and a rescan time of 0.225 sec.

These values are intolerable constraints in any practical configuration.

Figure 9:
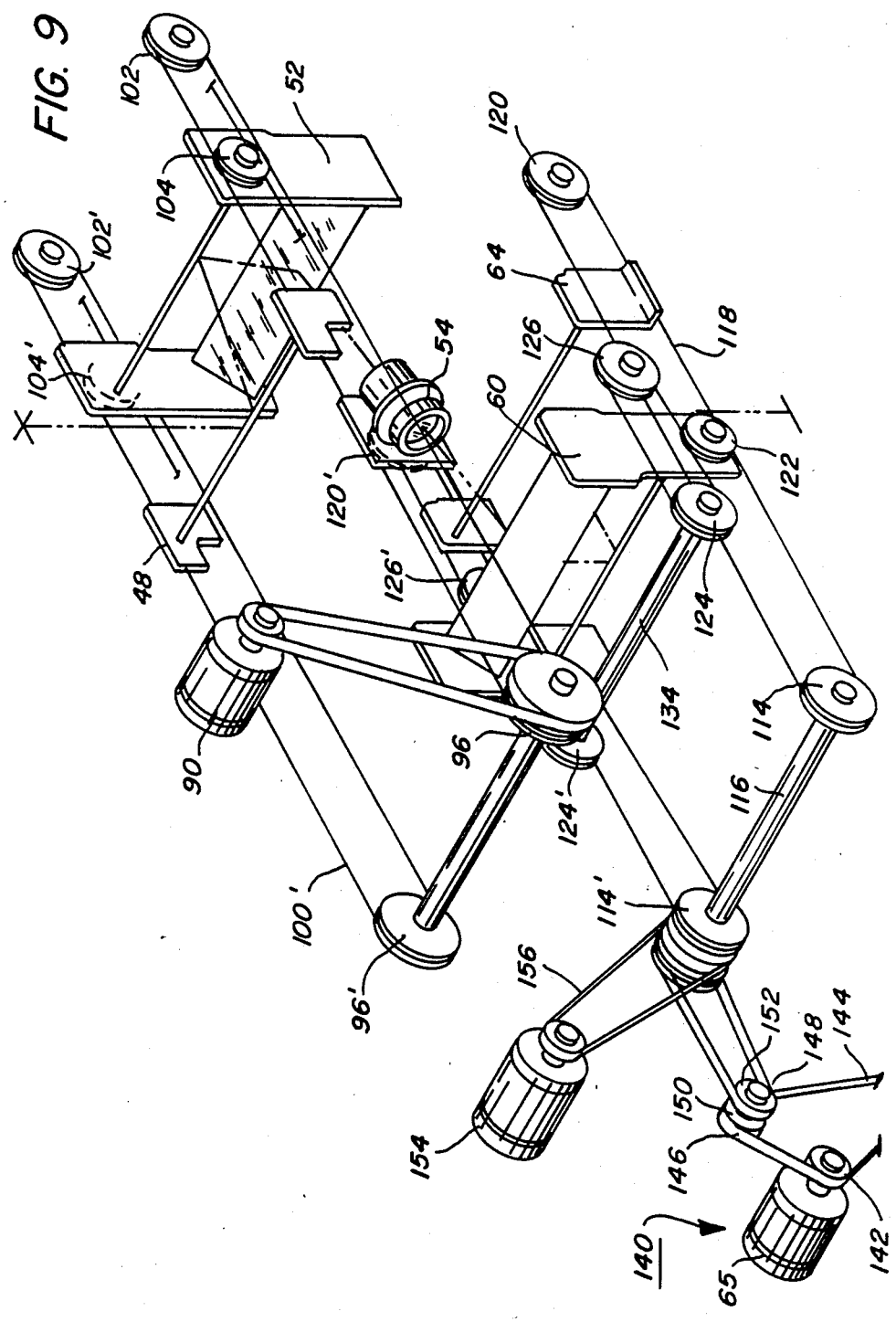
FIG. 9 is a top perspective view of the mechanical drive arrangement for moving the document scan and precession scan components in a second, constant precession, configuration.
Figure 10:
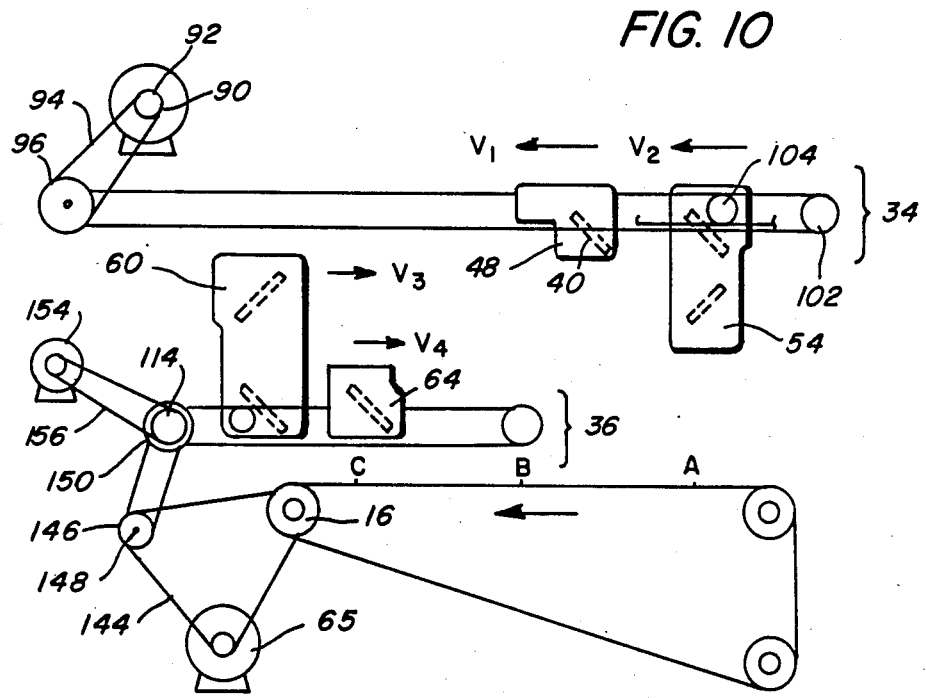
FIG. 10 is a simplified side view of the drive arrangement of FIG. 2.
Figure 11:
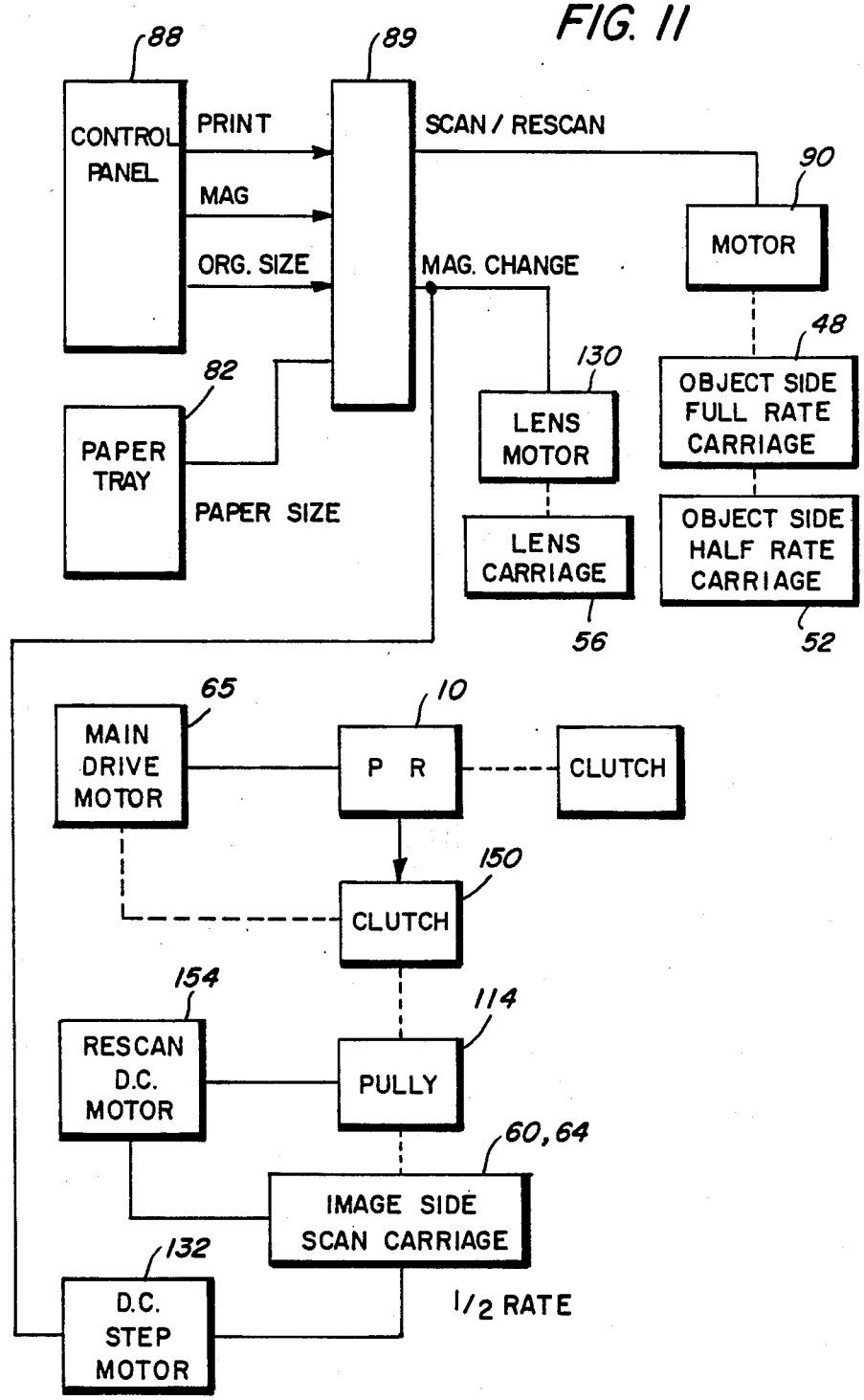
FIG. 11 is a control logic block diagram for controlling the scan operations of the constant precession system.

According to a further aspect of the invention, higher copy speeds are achieved by retaining the mechanical configuration of the object and image side scan system but decoupling the mechanical drives between the two systems. The image side scan system is instead, coupled to the photoreceptor drive. The image side optics are then driven at a constant speed proportional to the speed of the photoreceptor. The precession ratio $V_4/V_5$ does not change with changes in magnification, or with changes in paper size or document size. An exemplary constant precession system is shown in FIGS. 9 and 10. FIG. 11 is a logic control diagram for this system. Referring to these figures, FIG. 9 is identical to FIG. 2 except that object side scan system 34 is decoupled from image side scan system 36; e.g. pulleys 110, and cables 112, are omitted.

FIG. 10 has been modified by adding a constant precession drive system 140 shown in a top partial perspective, relative to the side perspective view of those same components which remain the same. As shown, main drive motor 65 has an output drive pulley 142 attached to its shaft. Pulley drives a photoreceptor pulley cable 144 attached to the shaft of photoreceptor drive roller 16. Pulley cable 144 is entrained about a third component, scan clutch pulley 146 attached to a shaft 148. A scan clutch 150 is operatively connected to pulley 152 at the other end of shaft 148. When the clutch is engaged, pulley 152 drives image side scan pulley 114', at a scan rate determined by the diameter of pulleys 114, 142, 146, 154. The clutch is disengaged at the end of scan; simultaneously, dc motor 154 is activated and drives shaft 116 via pulley 114' in the rescan direction by means of rescan cable 156.

The operation of the object side scan system of constant precession system of FIGS. 10, 11 is essentially the same as for the variable precession system, both for 1X and for variable magnification. For 1X operation, at the start of scan, the object and image side systems 34, 36 are in the solid line positions shown in FIG. 10. Scan servo motor 90 drives full rate carriage 48 at a previously determined scan speed $V_1$. Half rate carriage 52 moves in the scan direction at a rate $V_{\frac{1}{2}}$.

Photoreceptor belt 10 is driven in the indicated direction at a $V_5$ rate. Image side full rate carriage 64 is moved from left to right at a third rate $V_4$ which is defined by the expression $$V_V = P_{RAT} * V_5$$

Half rate scan carriage 60 is moved in the indicated direction at a rate of $V_3 = V_{4/2}$. As the scan progresses, the document image is laid down in the process direction along a precession distance BC. This distance is different than the variable precession case.

When the scan components reach the end of scan positions (mirrors 42, 62 are in the dotted line positions), scan clutch 150 is disengaged, rescan motor 154 is started and the image side optical system components are returned to the start-of-scan position. Clutch 150 is energized with the next copy cycle.

Figure 12:
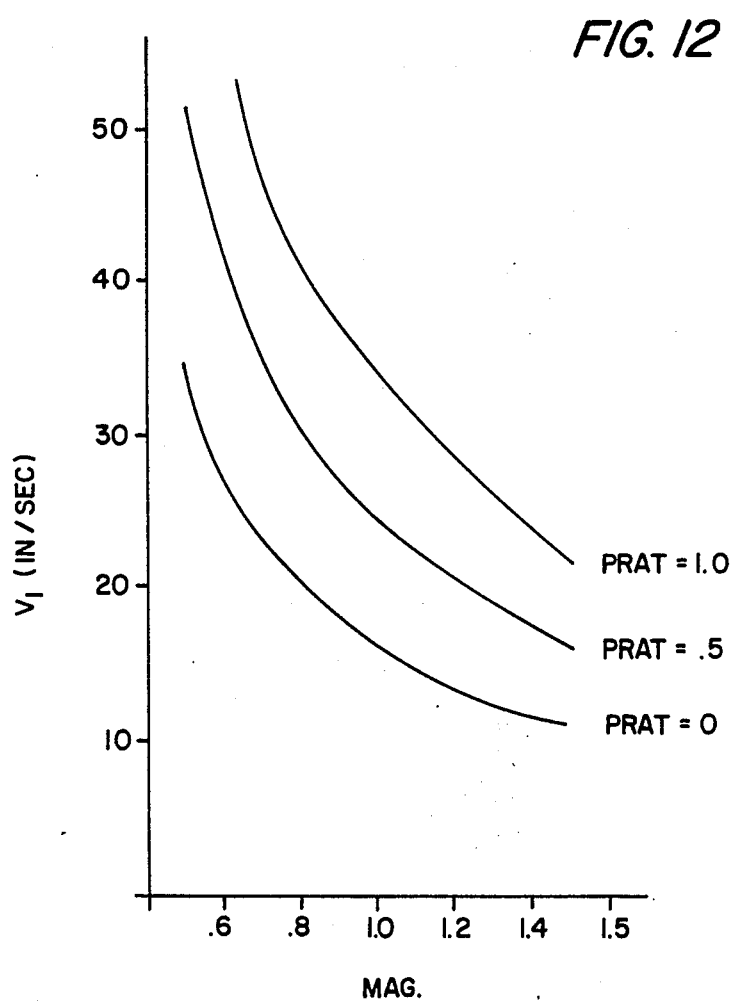
FIG. 12 is a plot of scan speed through a magnification range at different precession ratios for a constant precession system.

Referring again to FIGS. 10, 11 and 12 a change in magnification from 1X at the control panel generates a signal to controller 89 which, in turn, generates the signals required to move lens carriage 56 along the optical path.

Magnification changes are effected by the same mechanism previously described for variable precession except for the absence of the mechanical coupling between object and image sides.

A typical velocity profile over a scan cycle conforms to the profile shown in FIG. 5. Both $T_{EXP}$ and $T_{DCT}$ are identical expressions but now $P_{RAT}$ does not vary with MAG $$t_{DCT} = t_{cycle} - \frac{P_1 P_2 M}{1 + P_{RAT} V_5} \qquad (7)$$

$$\text{where } P_{RAT} = \frac{V_4}{V_5}$$

FIGS. 13 and 14 represent plots of magnification vs. $V_1$ (FIG. 13); and magnification vs. $t_{DCT}$ (FIG. 14) for various values of $P_{RAT}$ and at $V_5=16.5$ in/sec. (41.91 cm/sec) at a rate of 90 cpm for letter size documents.

As an example of parameters associated with 90 cpm constant precession scan systems at 1X magnification is as follows:

| | |
|---|---|
| scan speed $V_1$ = | 30.0 in/sec (76.2 cm/sec) |
| process speed $V_5$ = | 16.5 in/sec (41.91 cm/sec) |
| precess scan speed $V_3$ or $V_4$ = | 13.5 in/sec (34.29 cm/sec) |
| precession distance BC = | 4.7 in (11.94 cm) |

-continued

| | |
|---|---|
| prescan acceleration = | 2.0 g's |
| return time = | .245 sec |
| document change time = | .360 sec |
| precession ratio ($P_{RAT}$) = | .82 |
| exposure time = | .283 sec |

The defining characteristics of constant precession operation can now be summarized as follows:

1. The image side scan system 36 is decoupled from the object side scan system 34.
2. The image side system optics is driven at a rate proportional to the photoreceptor rate $V_5$.
3. The precession ratio $P_{RAT}$ is *not* a function of magnification; e.g. $P_{RAT} \neq f(m)$.
4. The precession scan (image side) maximum travels are dependent on output sheet size.

There have been described several exemplary systems for scanning a document utilizing a double dual rate scan system. While the embodiments described herein are presently preferred, other embodiments and modifications may be possible, consistent with the principles of the present invention.

What is claimed is:

1. A precession scanning system for an electrophotographic printing machine comprising:
    an object side scanning system adapted to incrementally scan/illuminate a document lying on a platen surface at a scan speed $V_1$;
    a lens positioned along the optical path, said object side scanning system reflecting said incrementally scanned images into said lenses;
    an image side scanning system adapted to reflect the projected incremental document images onto the surface of a photoreceptor in a direction opposite the direction of the moving photoreceptor along a precession distance and at a precession scan speed $V_4$;
    means for driving said object and image side scanning system in a scan and rescan direction at speeds relative to each other and to the photoreceptor speed so as to enable the image to be precessed onto the photoreceptor, said drive means comprising a first means for moving said object side optical system in a first scan direction at scan speed $V_1$, said first means mechanically coupled to said image side optical system so as to drive said image side system at a precession scan speed $V_4$ wherein said drive means includes an object side drive shaft and an image drive shaft and wherein said mechanical coupling means includes at least a first pulley attached to at least one end of the object side drive shaft, said first pulley having a diameter of $R_1$ and at least a second pulley attached to at least one end of said image side drive shaft, said second pulley having a diameter $R_2$, and a timing belt entrained about said first and second pulleys, whereby the precession scan speed $V_4$ is a function of the ratio $R_1/R_2$.

2. The scanning system of claim 1 wherein, coincidental with magnification changes, said drive means is further adapted to move the lens along the optical path, vary the scanning speed $V_1$ and adjust the position of at least one of the optical components comprising the image side system to adjust for total conjugate changes.

3. A variable precession scanning system for an electrophotographic printing machine comprising:
    an object side scanning system, including a scan/illuminator assembly for scanning a document on a platen at a scan speed $V_1$ and reflecting images therefrom into a mirror assembly moving at a speed of $V_{\frac{1}{2}}$;
    a projection lens positioned along the optical path to receive the document images reflected from the mirror assembly;
    a photoreceptor belt adapted to move in a first direction through an exposure zone at a process speed $V_5$;
    an image side scanning system including a precess scan mirror adapted to move in a direction opposite the photoreceptor motion at a precess scan speed $V_4$ and a mirror assembly positioned between said lens and said precess mirror and adapted to reflect projection images to said precess mirror, said mirror assembly moving at a speed $V_{4/2}$; and
    scan drive means for driving said scan/illumination assembly at a scan speed $V_1$ greater than photoreceptor speed $V_5$, said drive means mechanically coupled to said precess scan mirror, whereby said precess scan speed $V_4$ is a function of scan speed $V_1$ and wherein said drive means includes an object side drive shaft rotated by a motor device, said drive shaft having at least one pulley of diameter $R_1$ on one end thereof, said scan/illuminator assembly and object side mirror assembly connected to said drive shaft pulley by a pulley/cable arrangement, said drive means further including an image side drive shaft having at least one pulley of diameter $R_2$ on one end thereof, said shaft connected to said precess scan mirror and associated mirror assembly by a pulley/cable arrangement, and a timing belt entrained about said object and image side drive shaft pulleys whereby said precess scan mirror is driven at a speed $V_4$ proportional to $V_1 R_1 / R_2$.

4. The scanning system of claim 3 wherein said drive means further includes means for decoupling said image side drive shaft from said object side drive shaft coincident with a magnification change, means for changing the position of said image side mirror assembly to adjust for conjugate changes and means for recoupling the image side drive shaft to the object side drive shaft prior to scan operation.

5. The scanning system of claim 4 further including control means for sensing changes in system magnification, output copy sheet size or original document size and controlling the length and duration of operation of said scan drive means.

6. A constant precession scanning system for an electrophotographic printing machine comprising:
    an object side scanning system including a scan/illuminator assembly for scanning a document on a platen at a scan speed $V_1$ and reflecting images therefrom to a mirror assembly moving at a speed $V_{\frac{1}{2}}$;
    a projection lens positioned along the optical path to receive the document images reflected from the mirror assembly;
    a photoreceptor belt adapted to move through an exposure zone at a process speed $V_5$;
    an image side scanning system including a precess scan mirror adapted to move in a direction opposite the photoreceptor motion at a precess scan speed $V_4$ and a mirror assembly positioned between the lens and the precess mirror and adapted to reflect projected images to said precess mirror;

a first drive means for driving said scan/illuminator assembly at a scan speed $V_1$ greater than the photoreceptor speed $V_5$; and a second drive means adapted to commonly drive the photoreceptor and the precess scan mirror.

7. The scanning system of claim 6 wherein said first drive means includes an object side drive shaft rotated by a motor device, said drive shaft connected to said scan/illumination assembly and associated mirror assembly by a pulley cable arrangement and wherein said second drive means includes an image side drive shaft having at least one pulley of diameter $R_3$ attached to one end thereof, said drive shaft connected to said scan precession mirror and associated mirror assembly through a pulley/cable arrangement;

a main drive motor having a pulley of diameter $R_4$ attached to its output shaft, a photoreceptor pulley of diameter $R_5$ attached to a photoreceptor drive roller and a timing belt entrained about said image side scan shaft pulley, photoreceptor pulley and main drive motor pulley whereby the photoreceptor is driven at a rate proportional to $R_4/R_5$ and said precession scan mirror is driven at a rate proportional to $R_3/R_4$.

8. A precession scanning system for an electrophotographic printing machine comprising:

an object side scanning system adapted to incrementally scan/illuminate a document lying on a platen surface at a scan speed $V_1$;

a lens positioned along the optical path, said object side scanning system reflecting said incrementally scanned images into said lenses;

an image side scanning system adapted to reflect the projected incremental document images onto the surface of a photoreceptor in a direction opposite the direction of the moving photoreceptor along a precession distance and at a precession scan speed $V_4$;

means for driving said object and image side scanning system in a scan and rescan direction at speeds relative to each other and to the photoreceptor speed so as to enable the image to be precessed onto the photoreceptor; and photoreceptor drive means for driving said photoreceptor at a speed $V_5$, and mechanical coupling means between said photoreceptor drive means and said image side scanning system whereby said image side system is driven as a function of said photoreceptor speed.

9. The scanning system of claim 8 further including an image side drive shaft having at least one capstan pulley mounted thereon, said pulley having a diameter $R_3$, a photoreceptor drive pulley and a timing belt entrained thereon, said photoreceptor pulley having a diameter $R_4$, whereby said precess scan speed $V_4$ is proportional to the ratio of $R_3/R_4$.

* * * * *